US006457356B1

(12) United States Patent
Meloche

(10) Patent No.: US 6,457,356 B1
(45) Date of Patent: Oct. 1, 2002

(54) PISTON PUMP ELEVATOR HAVING FLUID LEVEL MEASUREMENT CAPABILTY

(75) Inventor: Joseph L. Meloche, Royal Oak, MI (US)

(73) Assignee: Ingersoll-Rand Company, Woodcliff Lake, NJ (US)

(*) Notice: Subject to any disclaimer, the term of this patent is extended or adjusted under 35 U.S.C. 154(b) by 0 days.

(21) Appl. No.: 09/458,907

(22) Filed: Dec. 10, 1999

(51) Int. Cl.[7] .......................... G01F 23/00; G01F 13/00; G01F 11/02

(52) U.S. Cl. .......................... 73/321; 73/319; 73/290 R; 222/262; 222/384; 222/405

(58) Field of Search .............................. 73/290 R, 313, 73/319, 321; 222/51, 384, 402, 262, 386, 389, 383.1, 405

(56) References Cited

U.S. PATENT DOCUMENTS

| | | | | | |
|---|---|---|---|---|---|
| 354,508 | A | * | 12/1886 | Fraleigh | |
| 2,074,959 | A | * | 3/1937 | Guest | 73/290 R |
| 2,294,198 | A | | 8/1942 | Morrel | |
| 3,459,042 | A | | 8/1969 | Brown | |
| 3,555,904 | A | | 1/1971 | Lenker | |
| 3,601,285 | A | | 8/1971 | Leger et al. | 222/20 |
| 3,758,003 | A | * | 9/1973 | Kautz et al. | 137/341 |
| 3,982,669 | A | * | 9/1976 | Moore | 222/146.5 |
| 3,994,169 | A | * | 11/1976 | Wolford | 73/290 R |
| 4,147,060 | A | * | 4/1979 | Fling et al. | 73/321 |
| 4,167,874 | A | | 9/1979 | Grant | |
| 4,265,263 | A | | 5/1981 | Hobbs | |
| 4,355,734 | A | | 10/1982 | Moore | 222/63 |
| 4,532,800 | A | * | 8/1985 | Coleman | 73/308 |
| 4,552,090 | A | * | 11/1985 | Coleman | 116/204 |
| 4,603,580 | A | | 8/1986 | Waring | |
| 4,632,281 | A | | 12/1986 | Wold | |
| 4,786,846 | A | | 11/1988 | Uchida | |
| 4,803,427 | A | * | 2/1989 | Mason et al. | 324/207 |
| 5,051,921 | A | | 9/1991 | Paglione | |
| 5,312,028 | A | * | 5/1994 | Hume | 222/1 |
| 5,400,651 | A | | 3/1995 | Welch | |
| 5,524,487 | A | | 6/1996 | Liu | |
| 5,553,740 | A | | 9/1996 | King et al. | 222/1 |
| 5,731,824 | A | | 3/1998 | Kneezel et al. | |
| 5,812,048 | A | * | 9/1998 | Ross, Jr. et al. | 338/128 |
| 6,082,888 | A | * | 7/2000 | Sakayori | 364/528.18 |

FOREIGN PATENT DOCUMENTS

| | | |
|---|---|---|
| DE | 43 40 235 A | 6/1995 |

OTHER PUBLICATIONS

International Search Report, Mailed Mar. 16, 2001, PCT/IB 00/01835—2 sheets.

"Systems, L.L.C., St. Petersburg, FL", Internet webpage for Sensor Systems, L.L.C., Copyright 2000, 1 page.

"Precision Potentiometers", "Embedded Potentiometers"; "Linear Motion Potentiometers"; "Model 140"; and "Model 150", from Internet website for Sensor Systems, L.L.C., Copyright 2000, 6 pages.

"Solid State Signal Conditioning Transducers for Potentiometers", Internet webpage for Sensor Systems, L.L.C., Copyright 2000, 3 pages.

"MTS Systems Corporation Sensors Group, Cary, NC", from Internet webpage for MTS Systems Corporation, Copyright 1999, 3 pages.

(List continued on next page.)

*Primary Examiner*—Hezron Williams
*Assistant Examiner*—Rose M. Miller
(74) *Attorney, Agent, or Firm*—Hahn Loesser & Parks LLP

(57) ABSTRACT

A piston pump elevator having fluid level measurement capability which is capable of providing an electrical signal proportional to the approximate amount of fluid remaining in a container from which fluid is being withdrawn.

11 Claims, 2 Drawing Sheets

OTHER PUBLICATIONS

"Temposonics III", from Internet webpage for MTS Systems Corporation, Cary, NC, 8 pages.

Advertising Brochure for Celesco Transducer Products, Inc., 3 pages.

Celesco Transducer Products, Inc., Copyright 2001, 6 pages.

"Easy and Reliable Position Measurement Catalog", Celesco Transducer Products, Inc., Canoga Park, CA 90309, cover page and pages i, 6–18, 37–38, 42–76.

* cited by examiner

PISTON PUMP ELEVATOR HAVING FLUID LEVEL MEASUREMENT CAPABILTY

BACKGROUND AND SUMMARY OF THE INVENTION

The present invention relates generally to a piston pump elevator having fluid level measurement capability. More particularly, the present invention relates to a piston pump elevator having fluid level measurement capability which is capable of outputting an electrical signal proportional to the approximate amount of fluid remaining in a container from which fluid is being withdrawn.

Piston pump elevators are commonly used to withdraw fluid from a container, such as, for example, a fifty five (55) gallon drum. In many situations, it is useful to know approximately how much fluid remains in a container from which fluid is being withdrawn for the purposes of, for example, tracking material inventory usage and forecasting usage. Unfortunately, many convention piston pump elevators utilize a follower plate positioned over the fluid which precludes the use of many conventional fluid level measuring techniques and devices. For example, fluid measurement techniques and devices utilizing ultrasonic, static pressure, capacitive and float level are generally not practical for conventional piston pump elevators since they require access to the top level of the fluid remaining in the container from which fluid is being withdrawn.

Accordingly, some conventional piston elevators utilize a mechanical limit switch to indicate when a container is completely or substantially empty. However, conventional piston elevators utilizing a mechanical limit switch do not provide information as to how much fluid remains in a container from which fluid is being withdrawn until the container is completely or substantially empty.

In addition, one can visually observe and/or physically measure the position of a follower plate in a conventional piston pump elevator to estimate the approximate amount of fluid remaining in the container from which fluid is being withdrawn. However, visually observing and/or physically measuring the position of a follower plate in a conventional piston pump elevator requires one to be physically present to visually observe and/or physically measure the position of the follower plate to estimate the approximate amount of fluid remaining in the container from which fluid is being withdrawn.

Accordingly, an object of the present invention is the provision of a piston pump elevator having fluid level measurement capability which allows the approximate amount of fluid remaining in a container from which fluid is being withdrawn to be measured without one being physically present to visually observe and/or physically measure the position of the follower plate.

Another object of the present invention is to provide a piston pump elevator having fluid level measurement capability which is capable of outputting an electrical signal proportional to the approximate amount of fluid remaining in a container from which fluid is being withdrawn.

Yet another object of the present invention is to provide a piston pump elevator having fluid level measurement capability which is capable of outputting an electrical signal proportional to the approximate amount of fluid remaining in a container from which fluid is being withdrawn which can be used by other electronic devices, such as an electronic inventory control system, to remotely indicate the approximate amount of fluid remaining in a container from which fluid is being withdrawn.

These and other objects of the present invention are attained by the provision of a piston pump elevator having fluid level measurement capability which is capable of outputting an electrical signal proportional to the approximate amount of fluid remaining in a container from which fluid is being withdrawn. In particular, a first preferred embodiment of the piston pump elevator includes a hook which is mounted on a crossbar and a cable extension transducer which is mounted to the piston pump elevator and its sensing element or cable connects to the hook. The sensing element is capable of measuring the position of said follower plate in relation to the container and providing an output signal. The transducer which is capable of receiving said output signal from said sensing element and providing an output voltage proportional to the approximate amount of the fluid remaining in the container from which the fluid is being withdrawn. Thus, as the follower plate rises, cable is drawn out from the cable extension transducer and its output voltage changes at a rate of, for example, one (1) volt per five (5) gallons of fluid remaining in the container from which fluid is being withdrawn. A second preferred embodiment of a piston pump elevator having fluid level measurement capability utilizes a polished tube, rather than a solid rod, for the cylinder rod which is attached to a crossbar by a sealing screw. The piston contains a through hole and a pocket for a sensing element, such as a magnet for a magnetostrictive transducer or a sliding contact for a linear resistance transducer. The sensing element transducer is mounted firmly at the bottom of the cylinder and electrical signals from the sensing device transducer are available through a connector. As in the first embodiment, the sensing element is capable of measuring the position of said follower plate in relation to the container and providing an output signal; and the transducer is capable of receiving said output signal from said sensing element and providing an output voltage proportional to the approximate amount of the fluid remaining in the container from which the fluid is being withdrawn. As the piston pump elevator raises the follower plate by pressurizing the bottom of the pistons on either side, the sensing element transducer raises as well. The sensing element transducer outputs a voltage signal proportional to the distance of the sensing element from its base. Thus, again, the output voltage changes at a rate proportional to the approximate amount of fluid remaining in the container from which fluid is being withdrawn.

Other advantages and novel features of the present invention will become apparent in the following detailed description of the invention when considered in conjunction with the accompanying drawings.

DETAILED DESCRIPTION OF THE DRAWINGS

Figure 1:
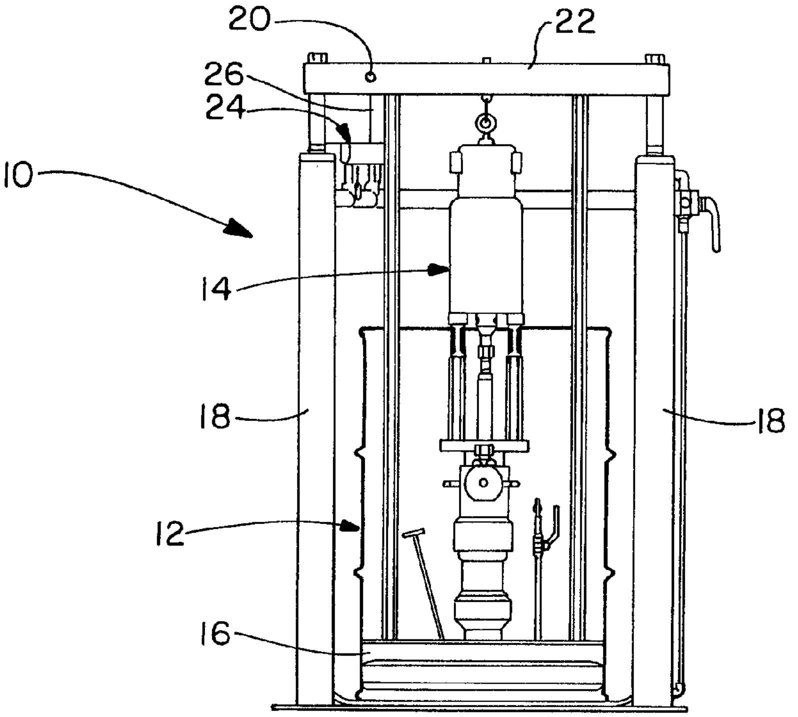
FIG. 1 is a side elevational view of a piston pump elevator having fluid level measurement capability with the container from which fluid is being withdrawn completely or substantially empty in accordance with a first preferred embodiment of the present invention.
Figure 2:
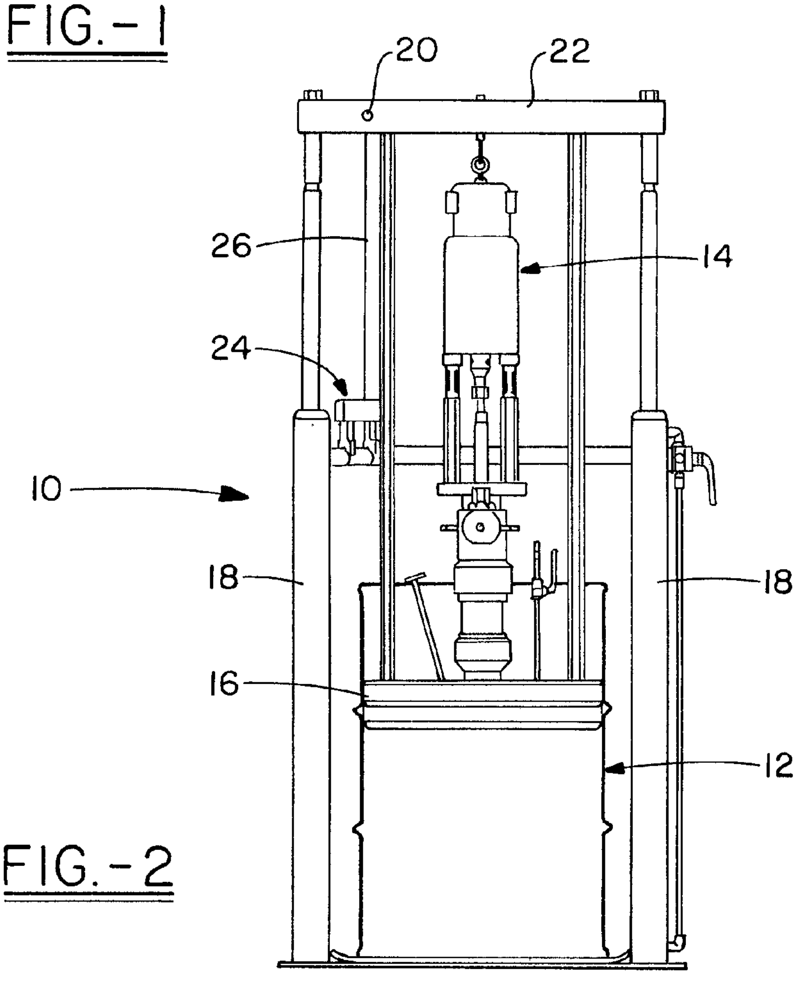
FIG. 2 is a side elevational view of a piston pump elevator having fluid level measurement capability with the container from which fluid is being withdrawn partially full in accordance with the first preferred embodiment of the present invention shown in FIG. 1.

In the following detailed description of a first preferred embodiment and a second preferred embodiment of the present invention, reference is made to the accompanying drawings which, in conjunction with this detailed description, illustrate and describe a first preferred embodiment and a second preferred embodiment of a piston pump elevator having fluid level measurement capability in accordance with the present invention. Referring first to FIGS. 1 and 2, which show a side elevational view of a piston pump elevator having fluid level measurement capability with the container from which fluid is being withdrawn completely or substantially empty in accordance with a first preferred embodiment of the present invention and a side elevational view of a piston pump elevator having fluid level measurement capability with the container from which fluid is being withdrawn partially full in accordance with the first preferred embodiment of the present invention shown in FIG. 1, respectively, a piston pump elevator having fluid level measurement capability in accordance with a first preferred embodiment of the present invention, generally identified by reference numeral 10, is shown. Piston pump elevator having fluid level measurement capability 10 is anticipated to be used in conjunction with container 12, such as, for example, a fifty five (55) gallon drum as shown in FIGS. 1 and 2, from which fluid level is withdrawn by piston pump elevator having fluid measurement capability 10.

Figure 3:
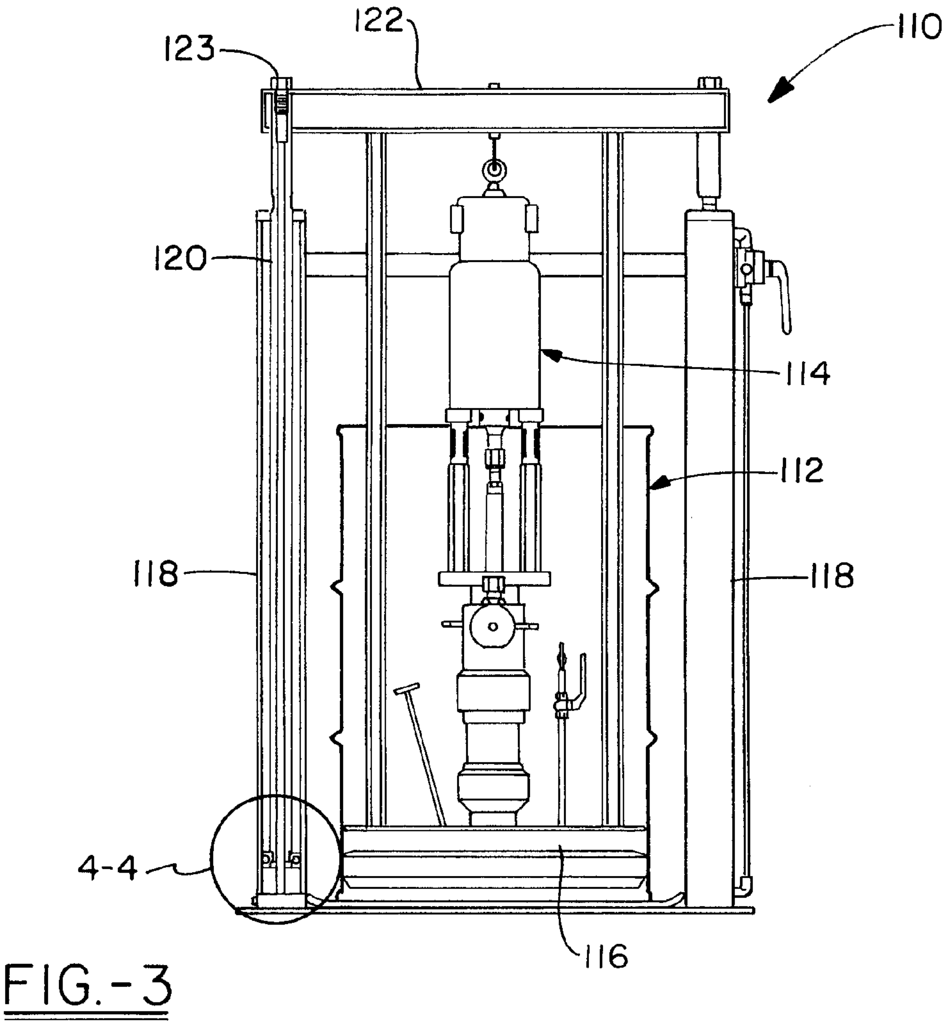
FIG. 3 is a side elevational view of a piston pump elevator having fluid level measurement capability with the container from which fluid is being withdrawn completely or substantially empty in accordance with a second preferred embodiment of the present invention.

The piston pump elevator according to a first embodiment of the present invention is shown in FIG. 1 and includes an elevator section, preferably, comprised of pneumatic cylinders 18 which carry and provide vertical translation of an upper support member or crossbar 22 by rods disposed with the cylinders. Similarly, the piston pump elevator according to a second embodiment of the present invention is shown in FIG. 3 and has an elevator section, preferably, comprised of pneumatic cylinders 118 which carry and provide vertical translation of an upper support member or crossbar 122 by rods disposed with the cylinders. The elevator sections of the piston pump elevators according to the preferred embodiments of the present invention are similar to those shown and described in U.S. Pat. No. 4,632,281 issued to Robert E. Wold.

Turning to FIG. 1, piston pump elevator having fluid level measurement capability 10 is shown being used in conjunction with a piston pump 14, which is preferably an air or electrically driven device that, through reciprocation of a displacement rod, pressurizes the fluid and forces it out of container 12. In order to both force the fluid from container 12 into the inlet of piston pump 14 and minimize contamination of the fluid being withdrawn from container 12, piston pump 14 is mounted to follower plate 16 which is forced downward by cylinders 18.

Piston pump elevator having fluid level measurement capability 10 further includes hook 20, which is positioned on crossbar 22. Cable extension transducer 24 is mounted on piston pump elevator having fluid level measurement capability 10 and the distal end of sensing cable 26 connects to hook 20. Cable extension transducer 24 is a cable-extension position transducer that is known in the art. As can be seen in moving from FIG. 1 to FIG. 2, as follower plate 16 rises, sensing cable 26 is drawn out of cable extension transducer 24 thereby increasing the output voltage of cable extension transducer 24 proportionally to the linear extension of cable 24. This output voltage may be input to an electronic device (not shown) which is capable of remotely indicating the amount of fluid remaining in the container. For example, if a rate of five (5) gallons of fluid per one (1) volt is used, if thirty five (35) gallons of fluid remains in container 12, the output voltage from cable extension transducer 24 would be seven (7) volts and when the fluid level in container 12 drops to eight (8) gallons, the output voltage from cable extension transducer 24 would be 1.6 volts.

Figure 4:
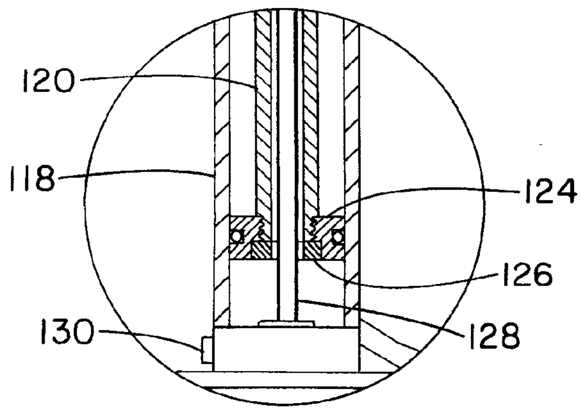
FIG. 4 is a detail partial view of the piston pump elevator having fluid level measurement capability with the container from which fluid is being withdrawn completely or substantially empty in accordance with the second preferred embodiment of the present invention shown in FIG. 3 taken from circle 4—4 in FIG. 3.

Referring next to FIGS. 3 and 4, a piston pump elevator having fluid level measurement capability in accordance with a second preferred embodiment of the present invention, generally identified by reference numeral 110, is shown. FIG. 3 shows a side elevational view of piston pump elevator 110 having fluid level measurement capability with the container from which fluid is being withdrawn completely or substantially empty. FIG. 4 shows a detail partial view of the piston pump elevator taken from circle 4—4 in FIG. 3. Piston pump elevator having fluid level measurement capability 110 is anticipated to be used in conjunction with container 112, such as, for example, a fifty five (55) gallon drum as shown in FIG. 3.

Piston pump elevator having fluid level measurement capability 110 is shown being used in conjunction with a piston pump 114, which is preferably an air or electrically driven device that, through reciprocation of a displacement rod, pressurizes the fluid and forces it out of container 112. In order to both force the fluid from container 112 into the inlet of piston pump 114 and minimize contamination of the fluid being withdrawn from container 112, piston pump 114 is mounted to follower plate 116 which is forced downward by cylinders 118.

Unlike the rods shown in the pneumatic cylinders of the '281 patent to Wold, piston pump elevator having fluid level measurement capability 110 according to the second embodiment of the present invention is hollow and most preferably utilizes a polished tube, rather than a solid rod, for cylinder rod 120. At one end, cylinder rod 120 is attached to crossbar 122 by sealing screw 123. At the other end, cylinder rod 120 is attached to a piston 124 that contains a through hole and a pocket for sensing element 126, coaxially located around a sensor rod 128 inside cylinder 120 as shown. Sensing element 126 is preferably a magnet for a magnetostrictive sensor or transducer or a sliding contact for a linear resistance sensor. The transducer or sensor rod 128 itself is mounted at the bottom of cylinder 118 and electrical signals from the transducer or sensor rod 128 are available through connector 130.

Preferably, sensing element 126 and sensing rod 128 comprise a magnetorestrictive position sensor or a linear resistance sensor.

As piston pump elevator having fluid level measurement capability 110 raises follower plate 116 by pressurizing the bottom of pistons 124, sensing element 126 raises as well. The transducer or sensor rod 128 sends a voltage signal proportional to the distance from sensing element 126 to its base. Thus, the output voltage increases at a rate of a predetermined number of gallons of fluid per volt. Accordingly, the output voltage is anticipated to be the same for piston pump elevator having fluid level measurement capability 10 and piston pump elevator having fluid level measurement capability 110.

Although the present invention has been described above in detail, the same is by way of illustration and example only and is not to be taken as a limitation on the present invention. It is apparent to those having a level of ordinary skill in the relevant art that other variations and modifications in a piston pump elevator having fluid level measurement capability in accordance with the present invention, as described and shown herein, could be readily made using the teachings of the present invention. Accordingly, the scope and content of the present invention are to be defined only by the terms of the appended claims.

What is claimed is:

1. A method of measuring the fluid level in a container, comprising the steps of:

providing a piston pump elevator to withdraw the fluid from the container, said piston pump elevator including a vertically reciprocable follower plate element adapted to be positioned on the top surface of the fluid;

providing a sensing element which is capable of measuring the position of said follower plate in relation to the container and providing an output signal, providing a transducer which is capable of receiving said output signal from said sensing element and providing an output voltage proportional to the approximate amount of fluid remaining in the container;

measuring the relative position of the follower plate in relation to the container by means of said sensing element; and using the measurement of the relative position of the follower plate in relation to the container to output an electrical signal proportional to the approximate amount of the fluid remaining in the container from which the fluid is being withdrawn.

2. A piston pump elevator assembly having fluid level measurement capability and being adapted to measure a fluid level in a container from which fluid may be withdrawn, comprising:

an elevator section having a stationary portion and a vertically movable portion;

an upper support member carried by said vertically movable portion of said elevator section and vertically movable therewith;

a follower plate connected to said upper support member and vertically movable therewith, said follower plate being adapted to be positioned on top of fluid in said container; and a sensing element which is capable of measuring the position of said follower plate in relation to the container and providing an output signal;

wherein as said follower plate moves, said sensing element provides an output signal indicative of the position of said follower plate.

3. A piston pump elevator according to claim 2, wherein said upper support member is a crossbar and said cable is attached to said crossbar by a hook.

4. A piston pump elevator according to claim 2, wherein said output signal is capable of being used by an electronic device to indicate the approximate amount of fluid remaining in a container upon attaching said piston pump elevator thereon with said follower plate resting on a fluid surface therein.

5. A piston pump elevator according to claim 2, further comprising a pump mounted above said follower plate and capable of pressurizing and forcing a fluid to be pumped by said follower plate as said follower plate moves within a container.

6. A piston pump elevator assembly according to claim 2, wherein said stationary portion of said elevator section comprises at least one cylinder;

said vertically movable portion of said elevator section comprises;

a piston in said cylinder and having a central opening therein; and a tubular cylinder rod attached to said piston and said upper support member;

said sensing element is received in said piston and has a central opening therein;

and wherein further said pump elevator assembly includes a stationary sensor rod in said cylinder and concentric therein;

said sensor rod extending upwardly from a base of said cylinder; and wherein further said sensing element and said sensor rod coact to generate an output signal which is indicative of the distance of said sensing element from said base.

7. A piston pump elevator assembly according to claim 2, further comprising a transducer which is capable of receiving said output signal from said sensing element and providing a transducer output signal which is indicative of the position of said follower plate and hence the approximate amount of fluid remaining in the container.

8. A piston pump elevator according to claim 7, wherein said transducer provides an output signal proportional to the relative motion between said upper support section and said elevator section.

9. A piston pump elevator assembly according to claim 7, wherein said transducer is a cable extension transducer mounted on a stationary portion of said elevator section and said sensing element is a sensing cable having one end attached to said upper support member.

10. A piston pump elevator assembly according to claim 7, wherein said transducer is a magnetostrictive transducer.

11. A piston pump assembly according to claim 7, wherein said transducer is a linear resistance transducer.

* * * * *